United States Patent
Eriksson

(10) Patent No.: US 7,866,698 B2
(45) Date of Patent: Jan. 11, 2011

(54) STEERING WHEEL ADJUSTING MECHANISM FOR MOTOR VEHICLES

(75) Inventor: Ulf Eriksson, Eskilstuna (SE)

(73) Assignee: Fuji Autotech AB, Eskilstuna (SE)

( * ) Notice: Subject to any disclaimer, the term of this patent is extended or adjusted under 35 U.S.C. 154(b) by 133 days.

(21) Appl. No.: 11/793,758

(22) PCT Filed: Dec. 16, 2005

(86) PCT No.: PCT/SE2005/001950

§ 371 (c)(1),
(2), (4) Date: Jul. 19, 2007

(87) PCT Pub. No.: WO2006/068588

PCT Pub. Date: Jun. 29, 2006

(65) Prior Publication Data

US 2008/0111362 A1    May 15, 2008

(30) Foreign Application Priority Data

Dec. 22, 2004   (SE) .................................... 0403134

(51) Int. Cl.
*B62D 1/18* (2006.01)
(52) U.S. Cl. .......................... 280/775; 280/779; 74/493
(58) Field of Classification Search ................ 280/775, 280/779; 74/492, 493
See application file for complete search history.

(56) References Cited

U.S. PATENT DOCUMENTS

| | | | | |
|---|---|---|---|---|
| 4,752,085 A * | 6/1988 | Yamamoto | .................. | 280/775 |
| 5,259,264 A * | 11/1993 | Bodin et al. | .................. | 74/493 |
| 5,409,261 A * | 4/1995 | Yamaguchi | ................. | 280/775 |
| 6,095,012 A | 8/2000 | Lutz et al. | | |
| 6,189,405 B1 * | 2/2001 | Yazane | ......................... | 74/493 |
| 6,604,439 B2 * | 8/2003 | Gaukel | ......................... | 74/493 |
| 6,662,674 B2 * | 12/2003 | Cartwright et al. | ............ | 74/493 |
| 6,688,644 B2 * | 2/2004 | Tsunoda et al. | ............. | 280/777 |
| 6,863,305 B2 * | 3/2005 | Hobaugh, II | ................ | 280/775 |
| 6,952,979 B2 * | 10/2005 | Cartwright et al. | ............ | 74/493 |
| 6,964,432 B2 * | 11/2005 | Morita et al. | ............... | 280/775 |
| 7,047,836 B2 * | 5/2006 | Hobaugh, II | ................ | 74/493 |

(Continued)

FOREIGN PATENT DOCUMENTS

DE      103 18 034      11/2004

(Continued)

*Primary Examiner*—Toan C To
(74) *Attorney, Agent, or Firm*—Dickstein Shapiro LLP

(57) ABSTRACT

The invention relates to a steering wheel adjusting mechanism (2) for motor vehicles (4) comprising a pivotally to the vehicle (4) attached supporting arm (8), and a pivotally to the supporting arm (8) attached steering shaft housing unit (12), where at least one locking plate package (14 and 16, respectively) is attached to both the vehicle (4) and the steering shaft housing unit (12), which locking plate package (14 and 16, respectively) is compressible with clamping means (18) in order to lock the steering shaft housing unit (12) relative to the vehicle (4). Optionally, the supporting arm (8) is pivotally attached to a to the vehicle (4) mountable fastening part (20). Optionally, the locking plate package (14 and 16, respectively) is attached to a firmly to the vehicle (4) mountable fastening unit (22). Optionally, the fastening part (20) and the fastening unit (22) are integrated with each other to a firmly to the vehicle (4) mountable steering wheel adjusting bracket (24).

10 Claims, 3 Drawing Sheets

U.S. PATENT DOCUMENTS

| | | | |
|---|---|---|---|
| 7,093,855 B2 * | 8/2006 | Manwaring et al. | 280/775 |
| 7,150,204 B2 * | 12/2006 | Uphaus et al. | 74/493 |
| 7,219,926 B2 * | 5/2007 | Ikeda et al. | 280/775 |
| 7,331,608 B2 * | 2/2008 | Armstrong et al. | 280/775 |
| 7,350,816 B2 * | 4/2008 | Ishida et al. | 280/777 |
| 2002/0020245 A1 | 2/2002 | Gaukel | |
| 2003/0094061 A1 | 5/2003 | Cartwright et al. | |
| 2004/0075263 A1 | 4/2004 | Muller | |

FOREIGN PATENT DOCUMENTS

| | | |
|---|---|---|
| EP | 0 671 308 A1 | 9/1995 |
| EP | 0 802 104 A1 | 10/1997 |
| EP | 1 201 526 A2 | 5/2002 |
| EP | 1 400 431 A1 | 3/2004 |

* cited by examiner

STEERING WHEEL ADJUSTING MECHANISM FOR MOTOR VEHICLES

FIELD OF THE INVENTION

The present invention relates to a steering wheel adjusting mechanism for motor vehicles.

BACKGROUND

Vehicles, e.g. cars, trucks and busses, generally have a steering wheel adjusting mechanism with which a driver may adjust the steering wheel in a for the present driver suitable position by partly displacing the steering wheel and that to the steering wheel attached steering column forwards and backwards relative to the direction of travel of the vehicle and partly, simultaneously or as an option, tilt the steering wheel and that to the steering wheel attached steering column in order to change the angular position of the steering wheel and the steering column relative to the vehicle. The steering wheel adjusting mechanism is lockable in such a way that the steering wheel and that to the steering wheel attached steering column after adjustment may be locked in a desired position relative to the vehicle at the same time as the steering wheel and that to the steering wheel attached steering column still may be turned around the axis of the steering column thereby enabling steering of the vehicle.

One example of a steering wheel adjusting mechanism for motor vehicles is shown in SE 465 563 C which shows a steering wheel adjusting mechanism for motor vehicles comprising a supporting arm pivotally attached to a part fixed on the vehicle, and a pivotally to the supporting arm attached steering shaft housing unit. The supporting arm is further attached over a first locking plate package to the steering shaft housing unit and over a second locking plate package to the fixed part of the vehicle in order to with these locking plate packages to lock the steering shaft housing unit relative to the vehicle.

A problem with the steering wheel adjusting mechanism above is that the supporting arm must be provided with means that couple and lock the two separate plate packages to the supporting arm in order to in this way to obtain locking of the steering shaft housing unit relative to the vehicle.

SUMMARY OF THE INVENTION

The problem with that the supporting arm must be provided with means that couple and lock the two separate plate packages to the supporting arm in order to in this way to obtain locking of the steering shaft housing unit relative to the vehicle, is solved according to the invention by providing a steering wheel adjusting mechanism for motor vehicles comprising a pivotally to the vehicle attached supporting arm, and a pivotally to the supporting arm attached steering shaft housing unit, where at least one locking plate package is attached to both the vehicle and the steering shaft housing unit which locking plate package is compressible with clamping means in order to lock the steering shaft housing unit relative to the vehicle.

By that the steering wheel adjusting mechanism comprises the features in claim 1, the advantage is obtained that means for coupling and locking of plate packages to the supporting arm is not needed. Thus, the advantage of a simpler construction with fewer parts which facilitates the manufacture of the steering wheel adjusting mechanism, is obtained.

By the features in the independent claim 8, the problem with to be able to manufacture a steering wheel adjusting mechanism which is simple to mount on a vehicle as only one part of the steering wheel adjusting mechanism must be fitted to attachment points in the vehicle, is further solved.

BRIEF DESCRIPTION OF THE DRAWINGS

The invention will be described in more detail below with reference to the accompanying drawings, wherein.

DESCRIPTION OF PREFERRED EMBODIMENTS

Figure 1:
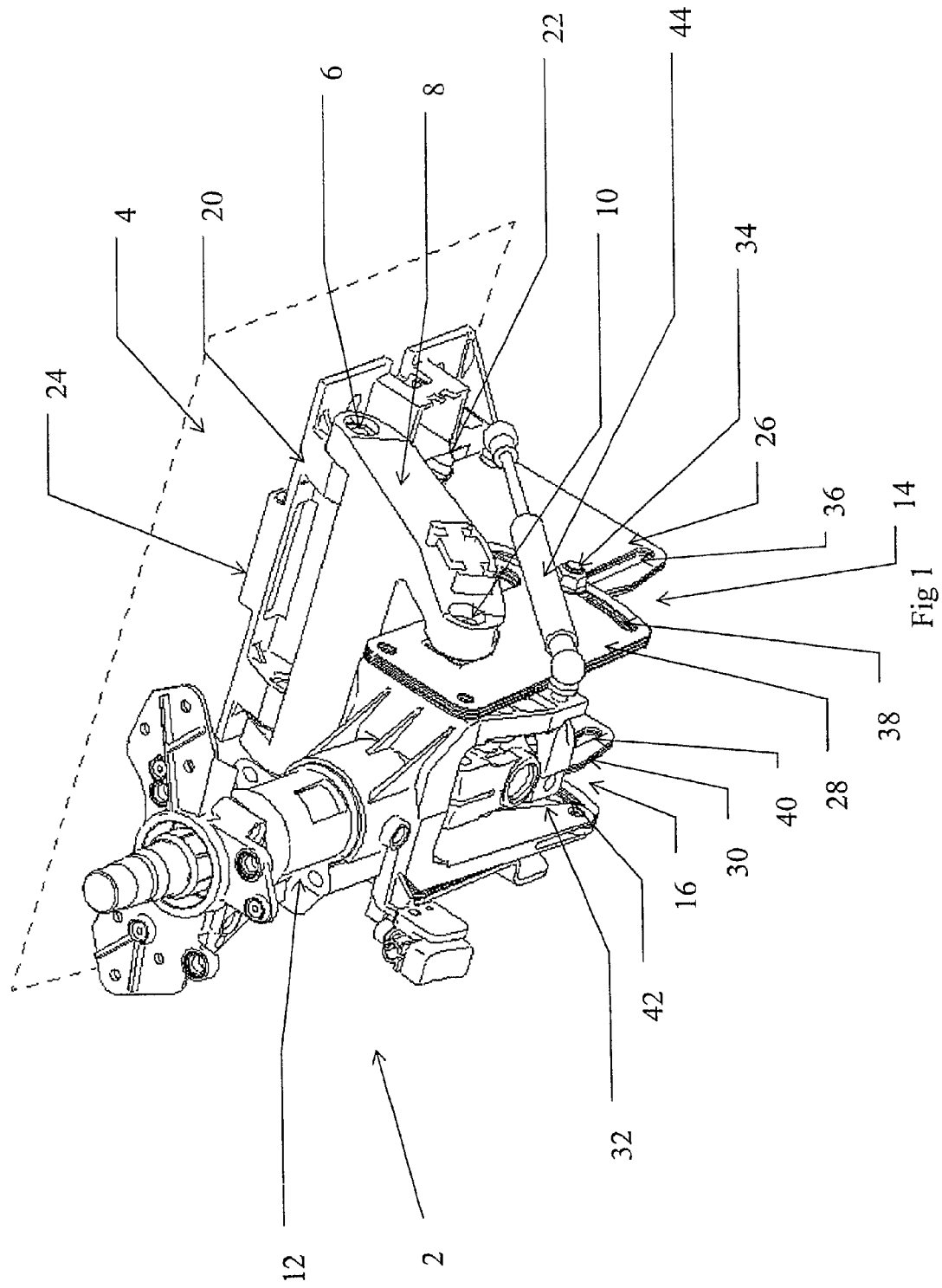
FIG. 1 shows schematically a view of one embodiment of a steering wheel adjusting mechanism according to the invention.

The same reference numerals are used for the same features in the different figures.

FIG. 1 shows schematically a view of an embodiment of a steering wheel adjusting mechanism 2 for a vehicle 4, the steering wheel adjusting mechanism 2 comprising a pivotally at a joint 6 to the vehicle 4 attached supporting arm 8, and a pivotally at a joint 10 to the supporting arm attached steering shaft housing unit 12. The steering wheel adjusting mechanism 2 further comprises at least one locking plate package 14,16 where one locking plate package 14;16 is attached to both the vehicle 4 and the steering shaft housing unit 12, which locking plate package 14;16 is compressible with clamping means in order to lock the steering shaft housing unit 12 relative to the vehicle 4.

According to the embodiment shown in FIG. 1 the supporting arm 8 is pivotally attached to the vehicle 4 by that the supporting arm 8 is pivotally attached to a firmly to the vehicle 4 mountable fastening part 20, and the locking plate package 14,16 is attached to the vehicle 4 by that the locking plate package 14,16 is attached to a firmly to the vehicle 4 mountable fastening unit 22, where the fastening part 20 and the fastening unit 22 are integrated with each other to a firmly to the vehicle 4 mountable steering wheel adjusting bracket 24.

As can be seen in FIG. 1 a locking plate package 14 and 16, respectively, comprises alternatingly to the vehicle 4, i.e. in this embodiment the steering wheel adjusting bracket 24, and the steering shaft housing unit 12 attached friction plates 26,28 and 30,32, respectively. The friction plates 26,28 and 30,32, respectively, in a locking plate package 14 and 16, respectively, are firmly attached to the vehicle 4, i.e. in this embodiment to the steering wheel adjusting bracket 24 and the steering shaft housing unit 12, respectively, and further moveably attached to each other. The friction plates 26,28 and 30,32, respectively, in a locking plate package 14 and 16, respectively, are moveably attached to each other by a plate package shaft 34 which extends through guide grooves 36,38 and 40,42, respectively, arranged in the mentioned friction plates 26,28 and 30,32, respectively. Preferably the vehicle 4 i.e. in this embodiment the steering wheel adjusting bracket 24 and the steering shaft housing unit 12 further pivotally attached to each other by a cylinder 44 which slows down the speed of a steering wheel adjusting movement in order to avoid that the steering wheel "falls down" when a driver disengages the locking of the steering wheel adjusting mechanism 2.

Figure 2:
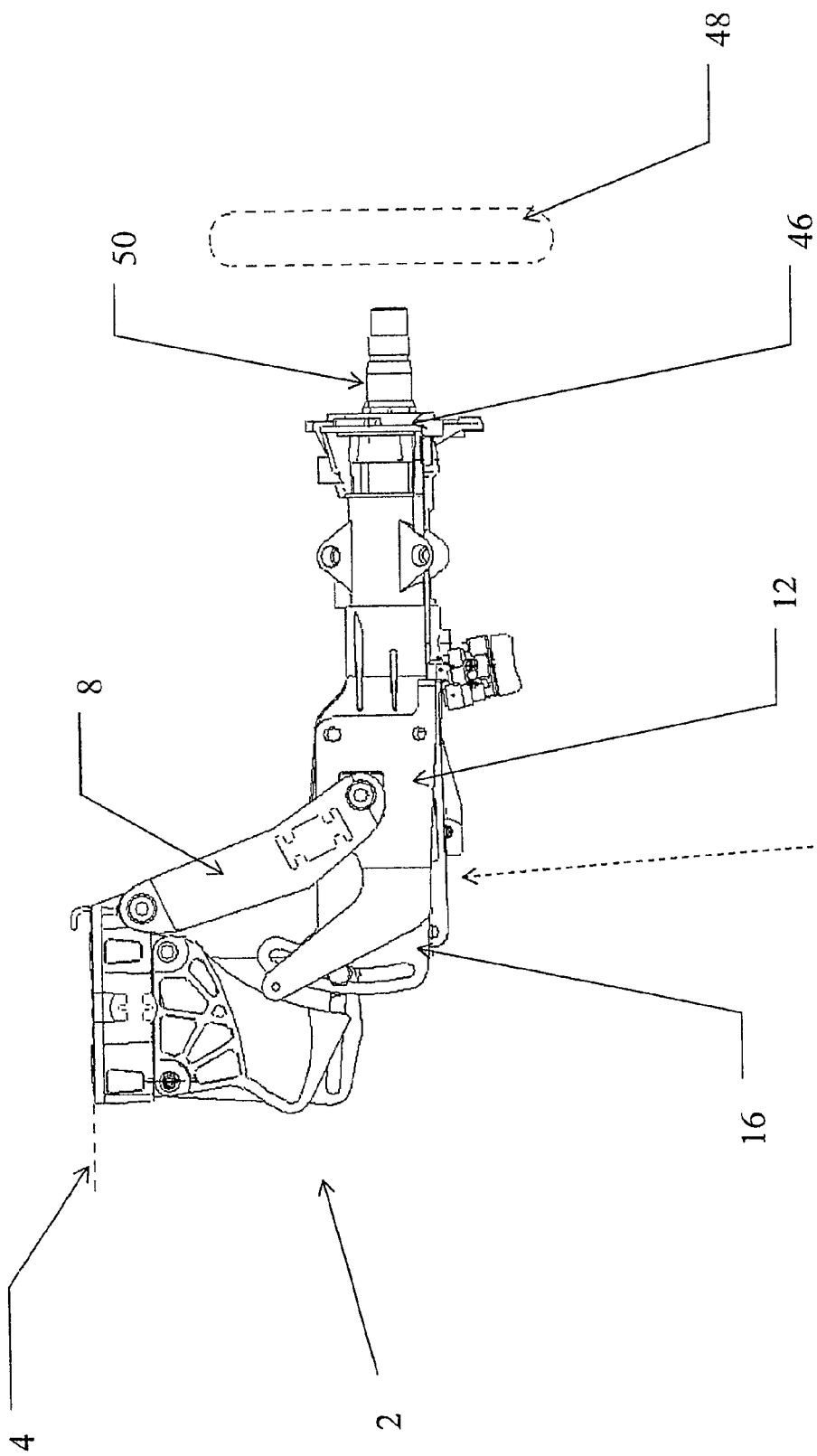
FIG. 2 shows schematically a side view of a steering wheel adjusting mechanism according to the embodiment of the invention shown in FIG. 1.

FIG. 2 shows schematically a side view of a steering wheel adjusting mechanism 2 according to the embodiment of the invention shown in FIG. 1, where the steering wheel adjusting mechanism 2 comprises a pivotally to the vehicle 4 attached supporting arm 8, and a pivotally to the supporting arm attached steering shaft housing unit 12. The steering wheel adjusting mechanism 2 further comprises at least one locking plate package 14,16 where a locking plate package 14;16 is attached to both the vehicle 4 and the steering shaft housing unit 12, which locking plate package 14;16 is compressible with clamping means in order to lock the steering shaft housing unit 12 relative to the vehicle 4. Further can be seen that the steering shaft housing unit 12 comprises a bearing device 46 in which an at a steering wheel 48 attached steering shaft 50 is pivotally mounted.

Figure 3:
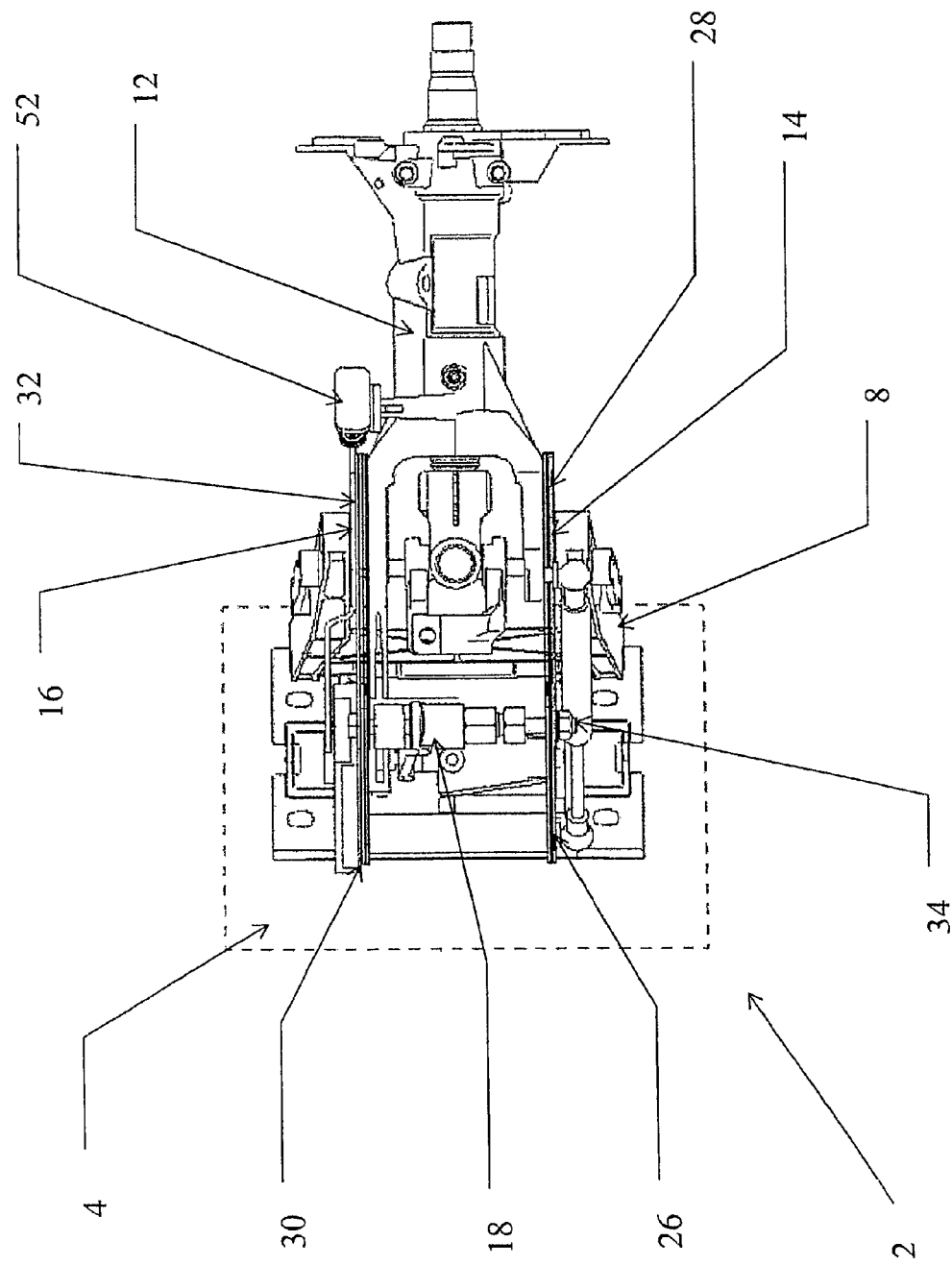
FIG. 3 shows schematically a bottom view of a steering wheel adjusting mechanism according to the embodiment of the invention shown in FIG. 1.

FIG. 3 shows schematically a bottom view of a steering wheel adjusting mechanism according to the embodiment of the invention shown in FIG. 1, where the steering wheel adjusting mechanism 2 comprises a pivotally to the vehicle 4 attached supporting arm 8, and a pivotally to the supporting arm attached steering shaft housing unit 12. The steering wheel adjusting mechanism 2 further comprises at least one locking plate package 14,16 where one locking plate package 14;16 is attached to both the vehicle 4 and the steering shaft housing unit 12, which locking plate package 14,16 is compressible with clamping means 18 in order to lock the steering shaft housing unit 12 relative to the vehicle 4. Further can be seen that the friction plates 26,28 and 30,32, respectively, in a locking plate package 14 and 16, respectively, which plates are arranged for locking of the steering shaft housing unit 12 relative to the vehicle 4, are compressible with a clamping means 18 which acts along the plate package axis 34. An actuator 52 for controlling of the clamping force of the clamping means 18 is arranged in connection to the steering wheel adjusting mechanism 2. According to this embodiment two parallel locking plate packages 14,16 are arranged in the steering wheel adjusting mechanism 2, which two locking plate packages 14,16 have friction plates 26,28 and 30,32, respectively, which are compressible with a common clamping means 18 arranged between the two locking plate packages 14,16.

In the embodiment described above the steering wheel adjusting mechanism 2 is provided with a firmly to the vehicle 4 mountable steering wheel adjusting bracket 24 in which the fastening part 20 and the fastening unit 22 are integrated with each other. In those cases where a steering wheel adjusting bracket 24 is not provided, other embodiments are possible, for example:

the supporting arm 8 may be pivotally attached to the vehicle 4 by that the supporting arm 8 is pivotally attached to a firmly to the vehicle mountable fastening part 20, at the same time as the locking plate package 14,16 may be fastened directly to the vehicle 4 or optionally to a firmly to the vehicle 4 mountable fastening unit 22, or the supporting arm 8 may be pivotally attached directly to the vehicle 4, at the same time as the locking plate package 14,16 may be fastened directly to the vehicle 4, or optionally to a firmly to the vehicle 4 mountable fastening unit 22.

Thus the locking plate package 14 and 16, respectively, may in these other embodiments comprise alternatingly with the steering shaft housing unit 12 and a firmly to the vehicle 4 mountable fastening unit 22 attached friction plates 26,28 and 30,32, respectively, or optionally comprise alternatingly with the steering shaft housing unit 12 and the vehicle 4 attached friction plates 26,28 and 30,32, respectively.

The friction plates 26,28 and 30,32, respectively, in a locking plate package 14 and 16, respectively, are, regarding to which embodiment that is referred to, firmly attached to the vehicle 4—or optionally to the fastening unit 22—or optionally to the steering wheel adjusting bracket 24, and to the steering shaft housing unit 12, respectively.

The invention claimed is:

1. Steering wheel adjusting mechanism for motor vehicles comprising a supporting arm (8) pivotally attached to a vehicle (4) by a fastening part (20) that is attached to the vehicle (4) in a fixed position, and a steering shaft housing unit (12) pivotally attached to the supporting arm (8), characterized in, that a first and second set of friction plates (26,28 and 30,32) form at least one locking plate package (14 and 16) whereby the first set of friction plates are attached to the vehicle (4) in a fixed position and the second set of friction plates are attached to the steering shaft housing unit (12) in a fixed position, such that the first and second set of friction plates are movably attached to each other, and such that the at least one locking plate package (14 and 16) is compressible with clamping means (18), without coupling and locking of the plate package to the supporting arm, in order to lock the steering shaft housing unit (12) relative to the vehicle (4).

2. Steering wheel adjusting mechanism according to claim 1, characterized in, that the at least one locking plate package (14 and 16) comprises friction plates (26,28 and 30,32) which are respectively attached in a fixed position to the vehicle (4) and to the steering shaft housing unit (12).

3. Steering wheel adjusting mechanism according to claim 1, characterized in, that the at least one locking plate package (14 and 16) is fixedly attached to a vehicle (4) mountable fastening unit (22).

4. Steering wheel adjusting mechanism according to claim 3, characterized in, that the at least one locking plate package (14 and 16) comprises friction plates (26,28 and 30,32) which are respectively attached in a fixed position to the mountable fastening unit (22) and to the steering shaft housing unit (12).

5. Steering wheel adjusting mechanism according to claim 1, characterized in, that the steering wheel adjusting mechanism (2) comprises a fastening part (20) for fixedly mounting the steering wheel adjusting mechanism to the vehicle (4), the supporting arm (8) pivotally attached to the fastening part (20), and the steering shaft housing unit (12) that is pivotally attached to supporting arm (8), and wherein the first set of friction plates of the at least one locking plate package (14 and 16) is attached to the vehicle (4) in the fixed position by the vehicle (4) mountable fastening unit (22).

6. Steering wheel adjusting mechanism according to claim 5, characterized in, that the fastening part (20) and the fastening unit (22) are an integrated unit attached in a fixed position to the vehicle (4) by a steering wheel adjusting bracket (24) that is firmly mountable to the vehicle (4).

7. Steering wheel adjusting mechanism according to claim 1, characterized in, that the friction plates (26,28 and 30,32) in said at least one locking plate package (14 and l6) are movably attached to each other by a plate package shaft (34) which extends through guide grooves (36,38 and 40,42) arranged in said friction plates (26,28 and 30,32).

8. Steering wheel adjusting mechanism according to claim 7, characterized in, that the friction plates (26,28 and 30,32) in the at least one locking plate package (14 and 16) are arranged for locking the steering shaft housing unit (12) relative to the vehicle (4) and are compressible with the clamping means (18), wherein the clamping means (18) acts along the locking plate package axis (34).

9. Steering wheel adjusting mechanism according to claim 1, characterized in, that an actuator (52) for controlling the clamping force of the clamping means (18) is arranged in connection to the steering wheel adjusting mechanism (2).

10. Steering wheel adjusting mechanism according to claim 1, characterized in, that two parallel locking plate packages (14 and 16) have friction plates (26,28 and 30,32) that are simultaneously compressible with the clamping means (18), and wherein the clamping means (18) is arranged between the two locking plate packages (14 and 16).

* * * * *